(12) United States Patent
Aiba (10) Patent No.: US 7,961,243 B2
(45) Date of Patent: Jun. 14, 2011

(54) CAMERA UNIT AND IMAGING APPARATUS

(75) Inventor: Daigo Aiba, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 983 days.

(21) Appl. No.: 11/727,811

(22) Filed: Mar. 28, 2007

(65) Prior Publication Data

US 2007/0229701 A1      Oct. 4, 2007

(30) Foreign Application Priority Data

Mar. 28, 2006   (JP) ............................... P2006-087898

(51) Int. Cl.
*H04N 5/225*       (2006.01)

(52) U.S. Cl. ........................................ 348/340; 348/65

(58) Field of Classification Search .................. 348/340, 348/342, 65
See application file for complete search history.

(56) References Cited

U.S. PATENT DOCUMENTS

| 5,861,654 A | 1/1999 | Johnson |
| 6,122,009 A | 9/2000 | Ueda |
| 6,628,339 B1 | 9/2003 | Ferland et al. |
| 2005/0219399 A1* | 10/2005 | Sato et al. ..................... 348/340 |

FOREIGN PATENT DOCUMENTS

| JP | 9-284617 | 10/1997 |
| JP | 10-51670 A | 2/1998 |
| JP | 2002-330321 A | 11/2002 |
| JP | 2005-326777 A | 11/2005 |

* cited by examiner

*Primary Examiner* — Tuan Ho
(74) *Attorney, Agent, or Firm* — Birch, Stewart, Kolasch & Birch, LLP (57) ABSTRACT

A camera unit 100 is provided and includes an imaging device for receiving light of an optical image incident from a lens unit; a support board for supporting the imaging device; and a holder having an attachment part to which the support board is attached. The attachment position of the support board in the optical axis direction to the holder is determined by means of an irregularity part formed on the attachment part of the holder or the support board so that the light reception surface of the imaging device matches the image formation position of the optical image.

6 Claims, 7 Drawing Sheets

CAMERA UNIT AND IMAGING APPARATUS

BACKGROUND OF THE INVENTION

1. Field of the Invention

This invention relates to a camera unit and an imaging apparatus, and in particular to a camera unit that can use imaging devices different in thickness in the optical axis direction and image formation position, and an imaging apparatus including the camera unit.

2. Description of Related Art

Generally, the image formation position of an optical image emitted from a lens unit becomes the same if the total thickness and refractive index of optical glass of dummy glass, an IR cut filter, cover glass for protecting the surface of an imaging device of a CCD, etc., are the same.

An imaging device of a CCD, etc., and optical glass of dummy glass, cover glass, etc., are held in an imaging device holder included in a camera unit. If an attempt is made to hold imaging devices different in thickness in the optical axis direction and image formation position in the same imaging device holder, the optical axis direction position of the light reception surface of the imaging device for receiving an optical image emitted from a lens unit shifts and thus the light reception surface of the imaging device and the image formation position of the optical image do not match.

Thus, hitherto, to use imaging devices different in thickness in the optical axis direction and image formation position, it has been necessary to use dedicated imaging device holders formed in a one-to-one correspondence with the imaging devices. (For example, refer to JP-A-2005-326777.)

However, if dedicated imaging device holders are manufactured in a one-to-one correspondence with imaging devices different in thickness in the optical axis direction and image formation, the cost of the mold charge, etc., much occurs, resulting in an increase in the cost.

SUMMARY OF THE INVENTION

An object of an illustrative, non-limiting embodiment of the invention is to provide a camera unit for making it possible to match the position of the light reception surface of an imaging device with the image formation position of an optical image from a lens unit if a plurality of imaging devices different in thickness in the optical axis direction and image formation position are held in a single imaging device holder and an imaging apparatus including the camera unit.

According to one aspect of the invention, there is provided a camera unit including: an imaging device that receives light of an optical image incident from a lens unit; a support board that supports the imaging device; and a holder having an attachment part to which the support board is attached. In the camera unit, at least one of the attachment part of the holder and the support board has an irregularity part, and the irregularity part determines an attachment position an attachment position of the support board in an optical axis direction with respect to the holder so that a light reception surface of the imaging device matches an image formation position of the optical image.

According to the configuration, if a plurality of imaging devices different in thickness in the optical axis direction and image formation position are held in the same imaging device holder, the position of the light reception surface of the imaging device can be matched with the image formation position of the optical image from the lens unit, so that it is not necessary to manufacture dedicated imaging device holders in a one-to-one correspondence with imaging devices different in thickness in the optical axis direction and image formation, and the cost of the mold charge, etc., can also be suppressed, resulting in a reduction in the cost.

In the camera unit, different support boards can be selectively attached to the attachment part of the holder in accordance with at least one of a thickness and the light reception surface of the imaging device.

The irregularity part may comprises a protrusion part on the attachment part of the holder and a notch or through hole in the support board so as to avoid the protrusion part, the protrusion part and the notch or through hole fitting together to determine the attachment position of the support board.

A first support board having the notch or through hole and a second support board not having the notch or through hole may be selectively attached to the attachment part of the holder.

To the end, according to another aspect of the invention, there is provided an imaging apparatus including the above-described camera unit.

BRIEF DESCRIPTION OF THE DRAWINGS

The features of the invention will appear more fully upon consideration of the exemplary embodiment of the invention, which are schematically set forth in the drawings, in which:

FIGS. 4A and 4B are drawings to show a state in which the first CCD support board according to the first embodiment of the invention is attached.

FIGS. 6A and 6B are drawings to show a state in which the second CCD support board according to the first embodiment of the invention is attached.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment, in the camera unit and the imaging apparatus including the camera unit, if a plurality of imaging devices different in thickness in the optical axis direction and image formation position are held in the same imaging device holder, the position of the light reception surface of the imaging device can be matched with the image formation position of the optical image from the lens unit. Therefore, it is not necessary to manufacture dedicated imaging device holders in a one-to-one correspondence with imaging devices different in thickness in the optical axis direction and image formation, and the cost of the mold charge, etc., can also be suppressed, resulting in a reduction in the cost.

Exemplary embodiments of the invention will be discussed in detail with reference to the accompanying drawings. Components having substantially the same function are denoted by the same reference numeral in the Specification and the accompanying drawings and will not be discussed duplicately.

First Embodiment

Figure 1A:
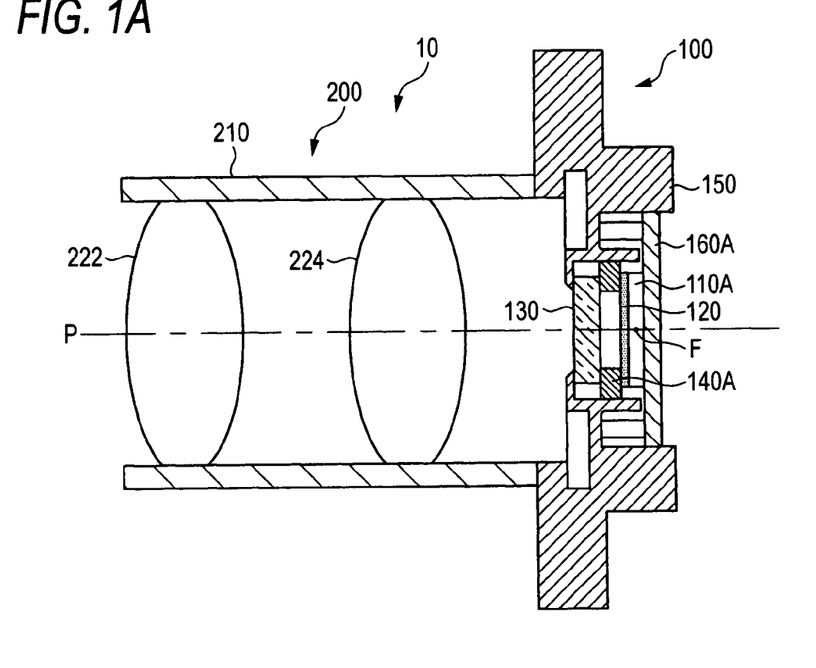
FIGS. 1A and 1B are sectional views to show an imaging apparatus according to a first exemplary embodiment of the invention.
Figure 1B:
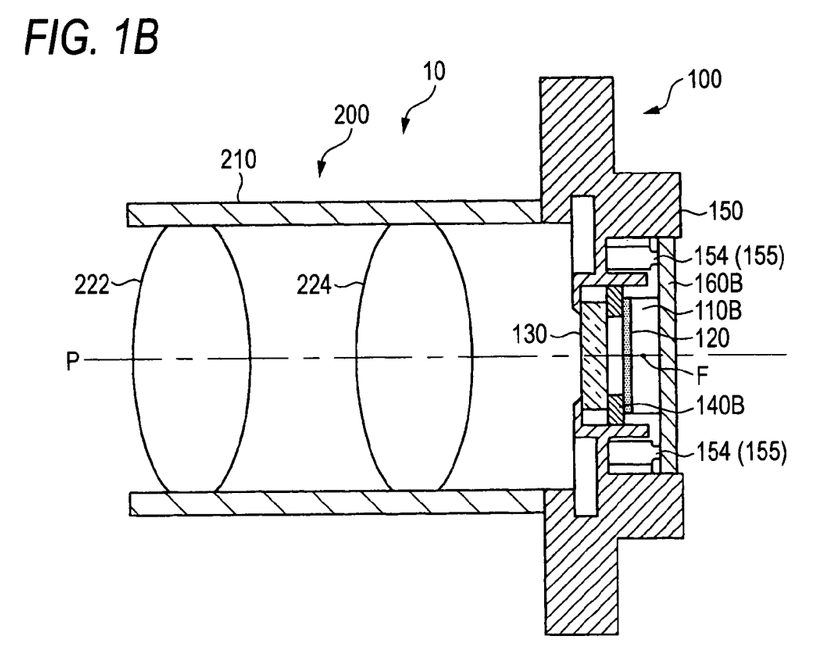

To begin with, the configuration of an imaging apparatus 10 according to a first exemplary embodiment of the invention will be discussed based on FIGS. 1A and 1B. FIGS. 1A and 1B are sectional views to show the general configuration of the imaging apparatus 10 according to the embodiment.

As shown in FIGS. 1A and 1B, the imaging apparatus 10 includes a camera unit 100 and a lens unit 200 that can be attached to and detached from the camera unit 100.

The camera unit 100 includes main components of a first CCD 110A or a second CCD 110B as an example of an imaging device for receiving an optical image emitted from the lens unit 200, cover glass 120 for protecting the surface of the first CCD 110A or the second CCD 110B, dummy glass 130, a first spacer 140A or a second spacer 140B placed between the first CCD 110A or the second CCD 110B and the dummy glass 130, a holder 150 for holding the first CCD 110A or the second CCD 110B, the dummy glass 130, and the first spacer 140A or the second spacer 140B, and a first CCD support board 160A or a second CCD support board 160B on which the first CCD 110A or the second CCD 110B is installed.

In the holder 150, the dummy glass 130, the first spacer 140A (or the second spacer 140B), and the first CCD 110A (or the second CCD 110B) are arranged along an optical axis P direction in order from the front of the camera unit 100 (the side of the lens unit 200). In the holder 150, the dummy glass 130 is sandwiched between the first spacer 140A (or the second spacer 140B) and the front end of the holder 150, whereby it is held or it is held by bonding.

In the embodiment, two types of CCDs, namely, the first CCD 110A and the second CCD 10B different in thickness in the optical axis P direction can be selectively used as an imaging device of CCD, etc., that can be held in the holder 150. Two types of spacers, the first spacer 140A and the second spacer 140B and two types of support boards, the first CCD support board 160A and the second CCD support board 160B are used in response to the two types of CCDs, the first CCD 110A and the second CCD 110B. FIG. 1A shows the case where the first CCD 110A having a thin thickness in the optical axis P direction is used, and FIG. 1B shows the case where the second CCD 110B having a thick thickness in the optical axis P direction is used. To use the second CCD 110B, the second CCD support board 160B is placed on a protrusion part 154 (155), as shown in FIG. 1B.

The lens unit 200 has a plurality of, for example, two optical lenses 222 and 224 arranged in the optical axis P direction in a lens camera cone 210 to make up a lens optical system. An optical image emitted from the lens unit 200 is received at the first CCD 110A (or the second CCD 110B) and is formed at a focus position F. In the embodiment, the first CCD 110A (or the second CCD 110B) is positioned so that the focus position F matches the position of the light reception surface of the first CCD 110A (or the second CCD 110B) in the optical axis P direction.

Next, the detailed configuration of the holder 150 of the camera unit 100 according to the embodiment and the positioning operation of the first CCD 110A (or the second CCD 110B) will be discussed based on FIGS. 2 to 6.

Figure 2A:
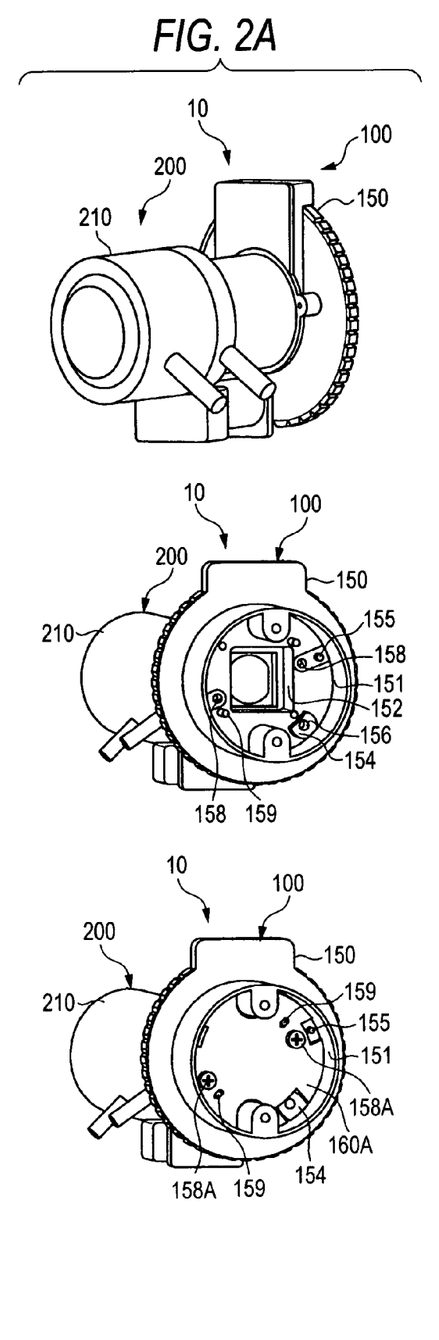
FIGS. 2A and 2B are perspective views to show the imaging apparatus in a state in which a lens unit is attached to a holder according to the first embodiment of the invention.
Figure 3A:
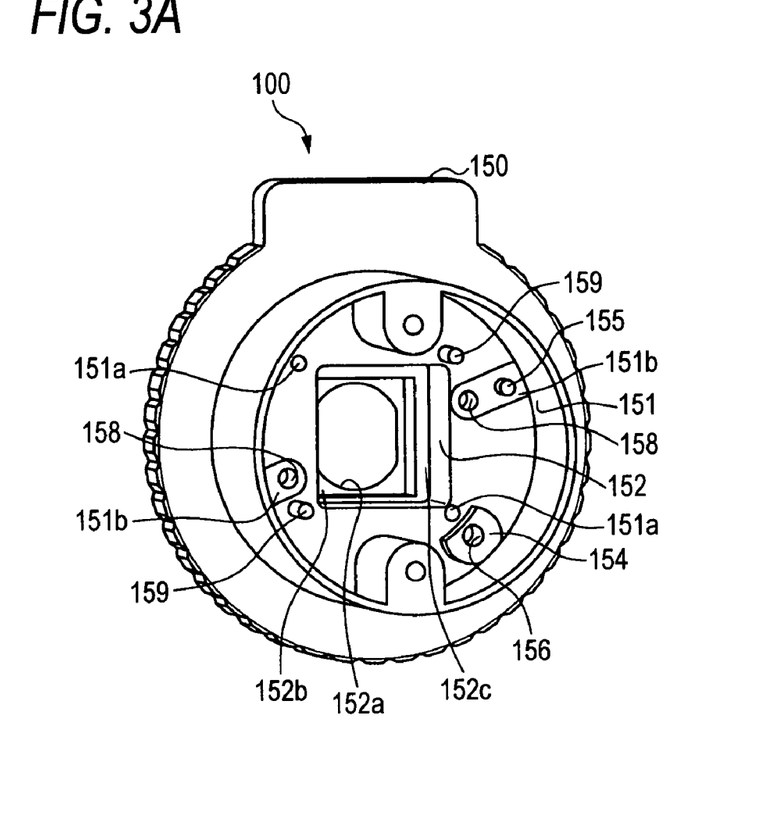
FIG. 3A is a perspective view to show the holder according to the first embodiment of the invention.
Figure 3B:
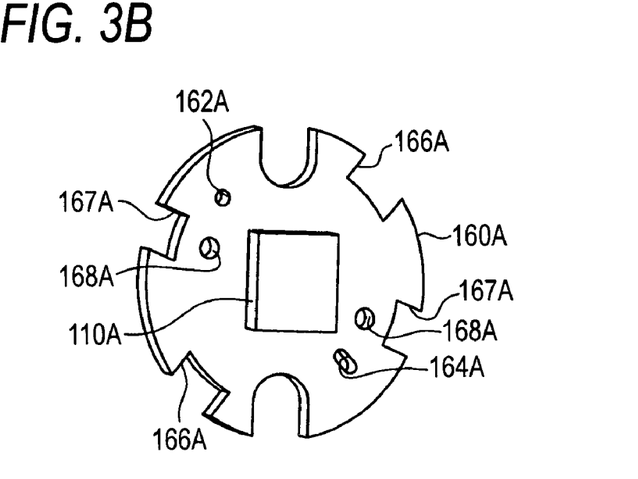
FIG. 3B is a perspective view to show a first CCD support board according to the first embodiment of the invention.

First, the configuration of the members when the first CCD 110A is held by the holder 150 according to the embodiment will be discussed in detail based on FIGS. 2A and 3. FIG. 2A is a perspective view to show the configuration of the imaging apparatus 10 when the lens unit 200 is attached to the holder 150 according to the embodiment. FIG. 3A is a perspective view to show the configuration of the holder 150 according to the embodiment and FIG. 3B is a perspective view to show the configuration of the first CCD support board 160A according to the embodiment.

As shown in FIG. 2A, the holder 150 according to the embodiment is attached to the rear end of the lens camera cone 210 of the lens unit 200 (end part on the side of the camera unit 100). The holder 150 has an attachment part 151 to which the first CCD support board 160A or the second CCD support board 160B can be selectively attached at the rear of the holder 150 (opposite side of the lens unit 200). To hold the first CCD 110A having a small thickness in the optical axis P direction, the first CCD support board 160A is attached to the attachment part 151.

As shown in FIGS. 2A and 3A, a hold part 152 for holding the dummy glass 130, the first spacer 140A, and the first CCD 110A is formed roughly at the center of the attachment part 151. The hold part 152 is made up of a first hold part 152b formed with an opening 152a for holding the dummy glass 130 and a second hold part 152c for holding the first spacer 140A.

The attachment part 151 is formed on the inner periphery with two types of protrusion parts, a first protrusion part 154 and a second protrusion part 155. The first protrusion part 154 and the second protrusion part 155 are placed so as to become roughly symmetrical with respect to the center of the attachment part 151. The shapes, the number, and the layout of the protrusion parts 154 and 155 are not limited to those described above.

A threaded hole 156 into which a fixing screw 156B for fixing the second CCD support board 160B attached to the attachment part 151 is fitted is formed so as to pierce the first protrusion part 154. The attachment part 151 is also formed with a threaded hole 158 into which a fixing screw 158A for fixing the first CCD support board 160A is fitted. Further, two positioning pins 159 for positioning the first CCD support board 160A are provided on the attachment part 151 so as to become roughly symmetrical with respect to the center of the attachment part 151. The positions and the number of the threaded holes 156 and 158 and the positions, the shapes, and the number of the positioning pins 159 are not limited.

As shown in FIGS. 2A and 3B, the first CCD support board 160A is provided with engagement holes 162A and 164A for engaging the two positioning pins 159 and further is formed with two through holes 168A through which the fixing screws 158A pass.

The first CCD support board 160A is formed with two notches 166A so as to avoid the first protrusion part 154 formed on the attachment part 151 of the holder 150 and two notches 167A so as to avoid the second protrusion part 155 when the first CCD support board 160A is attached to the attachment part 151 of the holder 150.

In FIG. 3B, the first CCD support board 160A and the first CCD 110A are formed in one piece by way of example. However, the first CCD support board 160A and the first CCD 110A need not necessarily be formed in one piece and the first CCD support board 160A may be formed in response to the thickness of the first CCD 110A in the optical axis P direction and the image formation position.

Figure 4A:
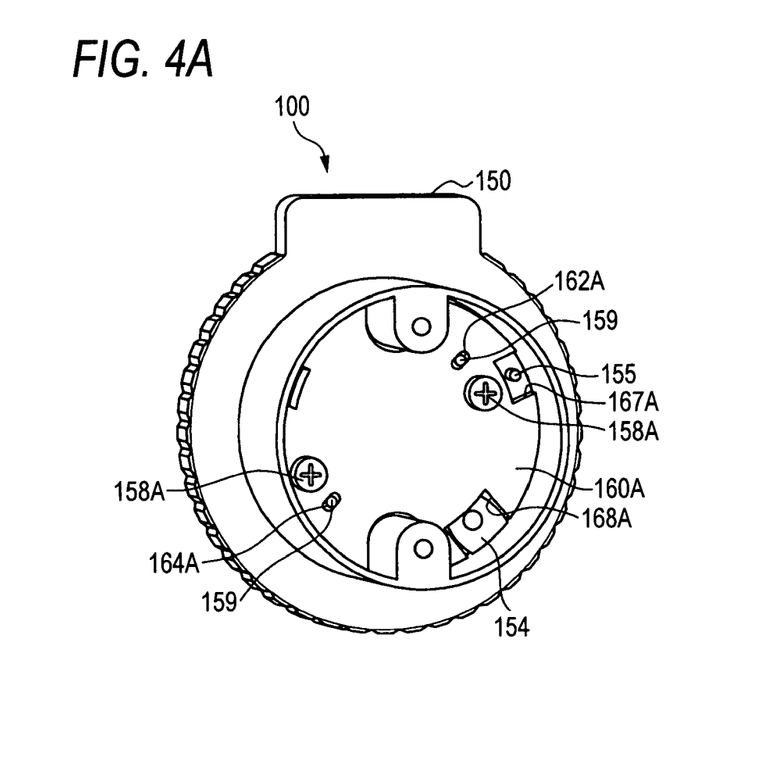
FIG. 4A is a perspective view and FIG. 4B is a sectional view.
Figure 4B:
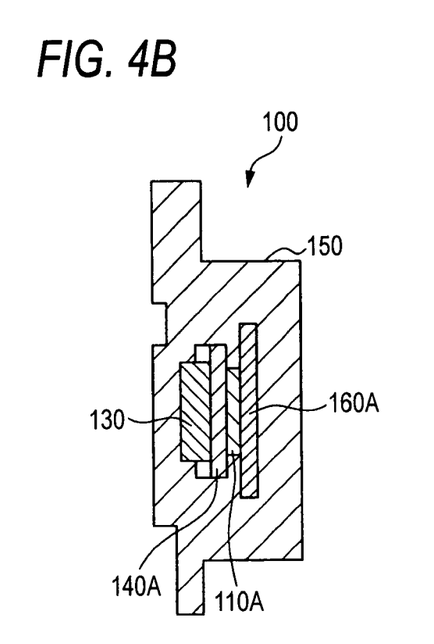

Next, the operation of attaching the first CCD support board 160A to the attachment part 151 of the holder 150 according to the embodiment and the state after the attachment will be discussed in detail based on FIGS. 2A and 4. FIGS. 4A and 4B are drawings to show a state in which the first CCD support board 160A is attached to the holder 150 according to the embodiment; FIG. 4A is a perspective view and FIG. 4B is a sectional view.

To attach the first CCD support board 160A to the holder 150 holding the dummy glass 130 and the first spacer 140A, first the positioning pins 159 and the engagement holes 162A and 164A are engaged with each other and the first CCD support board 160A in the attachment part 151 of the holder 150 is positioned, as shown in FIGS. 2A and 4A.

At this time, the first CCD support board 160A has the notches 166A formed so as to avoid the first protrusion part 154 and the notches 167A formed so as to avoid the second protrusion part 155 and thus abuts faces 151a and 151b in the attachment part 151 (the positions of the faces 151a and 151b in the optical axis direction are the same) and the first CCD 110A is held.

Next, in this state, the fixing screw 158A and the threaded hole 158 are fitted through the through hole 168A, whereby the first CCD support board 160A is fixed in the attachment part 151 and the dummy glass 130, the first spacer 140A, and the first CCD 110A are held in the holder 150 as shown in FIG. 4B.

In the embodiment, the first CCD support board 160A is positioned using the first protrusion part 154 and the second protrusion part 155 formed on the attachment part 151 of the holder 150 and the notches 166A and 167A formed in the first CCD support board 160A so as to avoid the first protrusion part 154 and the second protrusion part 155 in combination, but the invention is not limited to the combination of the protrusion parts and the notches. For example, the first CCD support board 160A may be positioned using a protrusion part formed on the attachment part 151 of the holder 150 and a through hole made in the first CCD support board 160A so as to avoid the protrusion part. The protrusion part is not limited to the protrusion part formed on the attachment part 151 of the holder 150; the attachment position of the first CCD support board 160A in the optical axis P direction to the holder 150 may be determined by the irregularity part (i.e., the protrusion part, notch or through hole) formed on the attachment part 151 of the holder 150 or the first CCD support board 160A so that the light reception surface of the first CCD 110A matches the image formation position of an optical image from the lens unit 200.

Figure 2B:
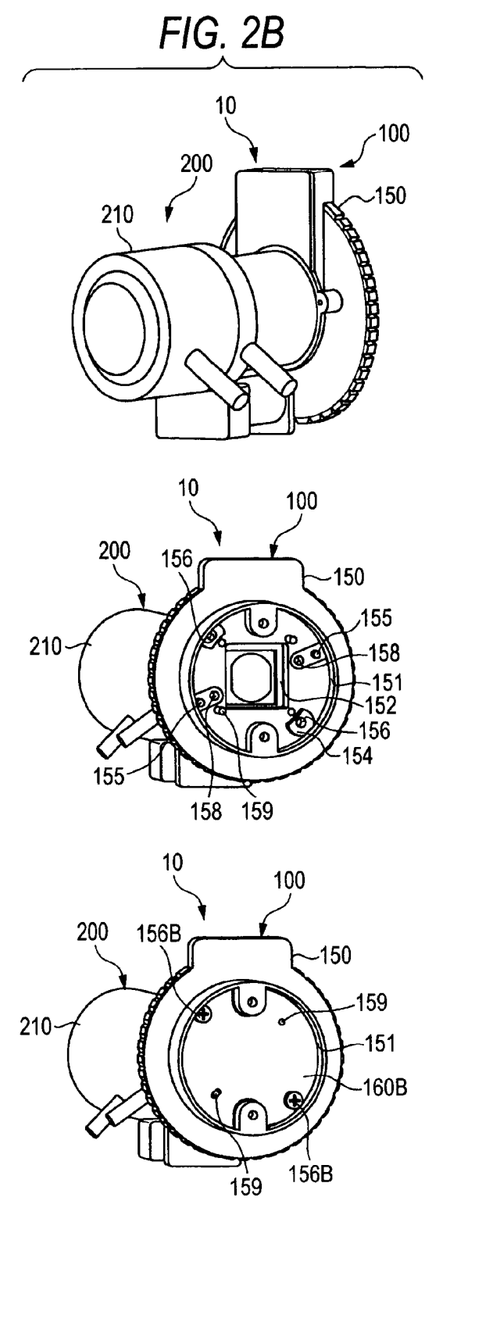
Figure 5A:
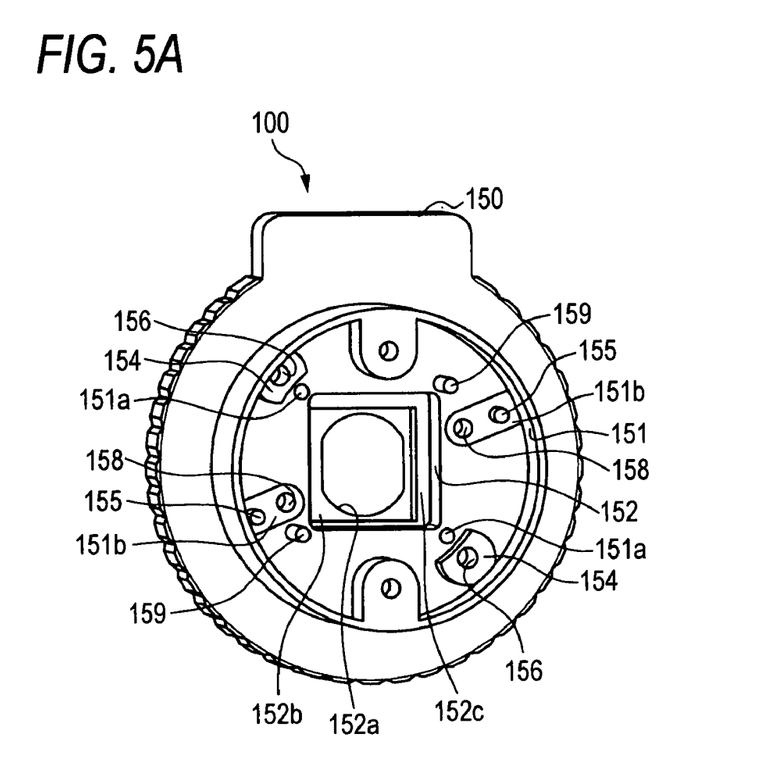
FIG. 5A is a perspective view to show the holder according to the first embodiment of the invention.
Figure 5B:
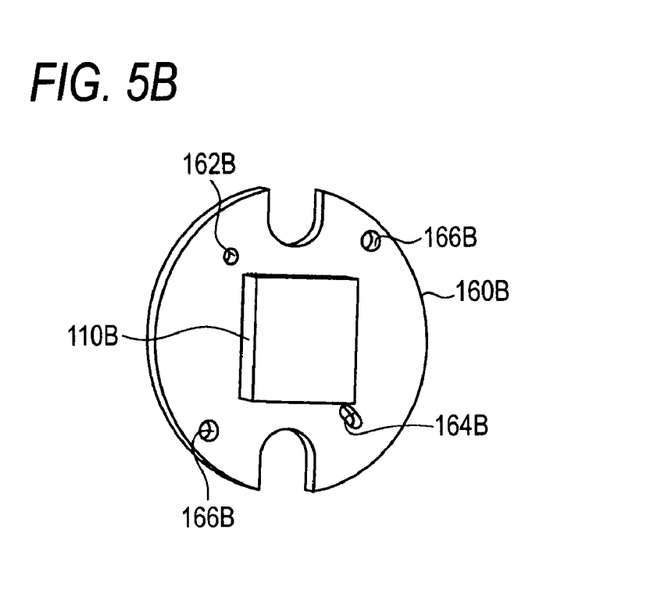
FIG. 5B is a perspective view to show a second CCD support board according to the first embodiment of the invention.

Next, the configuration of the members when the second CCD 110B is held by the holder 150 according to the embodiment will be discussed in detail based on FIGS. 2B and 5. FIG. 2B is a perspective view to show the configuration of the imaging apparatus 10 when the lens unit 200 is attached to the holder 150 according to the embodiment. FIG. 5A is a perspective view to show the configuration of the holder 150 according to the embodiment and FIG. 5B is a perspective view to show the configuration of the second CCD support board 160B according to the embodiment.

As shown in FIG. 2B, the holder 150 according to the embodiment is attached to the rear end of the lens camera cone 210 of the lens unit 200 (end part on the side of the camera unit 100). The holder 150 has an attachment part 151 to which the first CCD support board 160A or the second CCD support board 160B can be selectively attached at the rear of the holder 150 (opposite side of the lens unit 200). To hold the second CCD 110B, the second CCD support board 160B is attached to the attachment part 151.

As shown in FIGS. 2B and 5A, the hold part 152 for holding the dummy glass 130, the second spacer 140B, and the second CCD 110B is formed roughly at the center of the attachment part 151. The hold part 152 is made up of the first hold part 152b formed with the opening 152a for holding the dummy glass 130 and the second hold part 152c for holding the second spacer 140B.

The configuration of the first protrusion part 154, the second protrusion part 155, the threaded holes 156 and 158, the positioning pins 159, and the like has been described above in detail and therefore will not be discussed again.

As shown in FIGS. 2A and 3B, the second CCD support board 160B is provided with engagement holes 162B and 164B for engaging the two positioning pins 159 and further is formed with two through holes 168B through which the fixing screws 158B pass.

Unlike the first CCD support board 160A, the second CCD support board 160B is not formed with any notches or through holes so as to avoid the first protrusion part 154 and the second protrusion part 155 formed on the attachment part 151 of the holder 150 when the second CCD support board 160B is attached to the attachment part 151 of the holder 150.

In FIG. 3B, the second CCD support board 160B and the second CCD 110B are formed in one piece by way of example. However, the second CCD support board 160B and the second CCD 110B need not necessarily be formed in one piece and the second CCD support board 160B may be formed in response to the thickness of the second CCD 110B in the optical axis P direction and the image formation position.

Next, the operation of attaching the second CCD support board 160B to the attachment part 151 of the holder 150 according to the embodiment and the state after the attachment will be discussed in detail based on FIGS. 2B and 6. FIGS. 6A and 6B are drawings to show a state in which the second CCD support board 160B is attached to the holder 150 according to the embodiment; FIG. 4A is a perspective view and FIG. 4B is a sectional view.

Figure 6A:
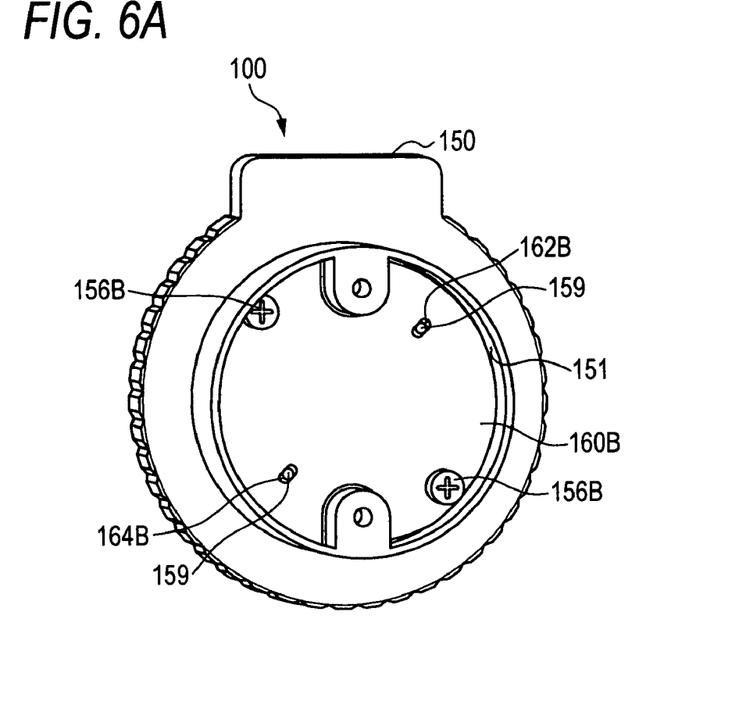
FIG. 6A is a perspective view and FIG. 6B is a sectional view.

To attach the second CCD support board 160B to the holder 150 holding the dummy glass 130 and the second spacer 140B, first the positioning pins 159 and the engagement holes 162B and 164B are engaged with each other and the second CCD support board 160B in the attachment part 151 of the holder 150 is positioned, as shown in FIGS. 2B and 6A.

At this time, the second CCD support board 160B does not have any notches or through holes formed so as to avoid the first protrusion part 154 and the second protrusion part 155 as described above and thus abuts the surface of the first protrusion part 154 and the surface of the second protrusion part 155 in the attachment part 151 (the positions of the surface of the first protrusion part 154 and the surface of the second protrusion part 155 in the optical axis direction are the same) and the second CCD 110B is held.

Figure 6B:
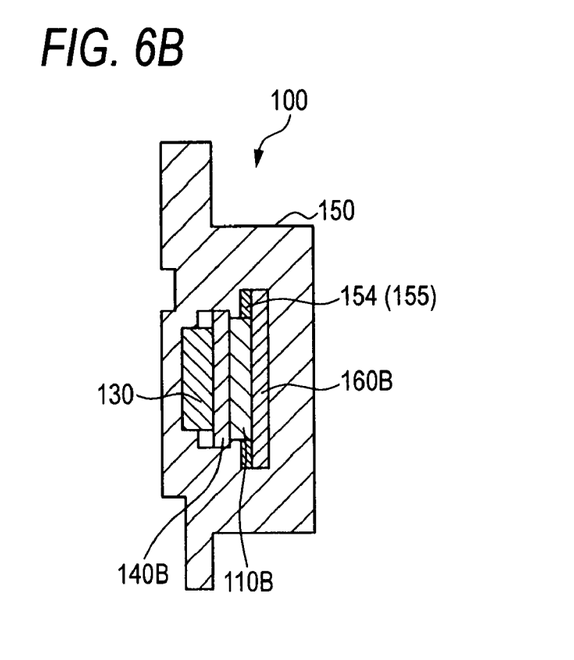

Next, in this state, the fixing screw 156B and the threaded hole 156 are fitted through the through hole 166B, whereby the second CCD support board 160B is fixed in the attachment part 151 and the dummy glass 130, the second spacer 140B, and the second CCD 110B are held in the holder 150 as shown in FIG. 6B.

As described above, in the embodiment, the first CCD support board 160A and the second CCD support board 160B formed corresponding to the first CCD 110A and the second CCD 110B different in thickness in the optical axis P direction and image formation position can be selectively attached to the holder 150 and the shapes of the holder 150 and the two types of boards 160A and 160B are designed, whereby if the first CCD 110A and the second CCD 110B different in thickness in the optical axis P direction and image formation position are held in the same holder 150, the position of the light reception surface of the CCD 110A, 110B can be matched with the image formation position of the optical image from the lens unit 200. Specifically, the first protrusion part 154 and the second protrusion part 155 are provided in the attachment part 151 of the holder 150 and the notches 166A and 167A formed so as to avoid the two types of protrusion parts 154 and 155 are provided in the first CCD support board 160A and not provided in the second CCD support board 160B, whereby if either of the first CCD 110A and the second CCD 110B different in thickness in the optical axis P direction and image formation position is used, the position of the light reception surface of the CCD 110A, 110B can be matched with the image formation position of the optical image from the lens unit 200.

Second Embodiment

Figure 7A:
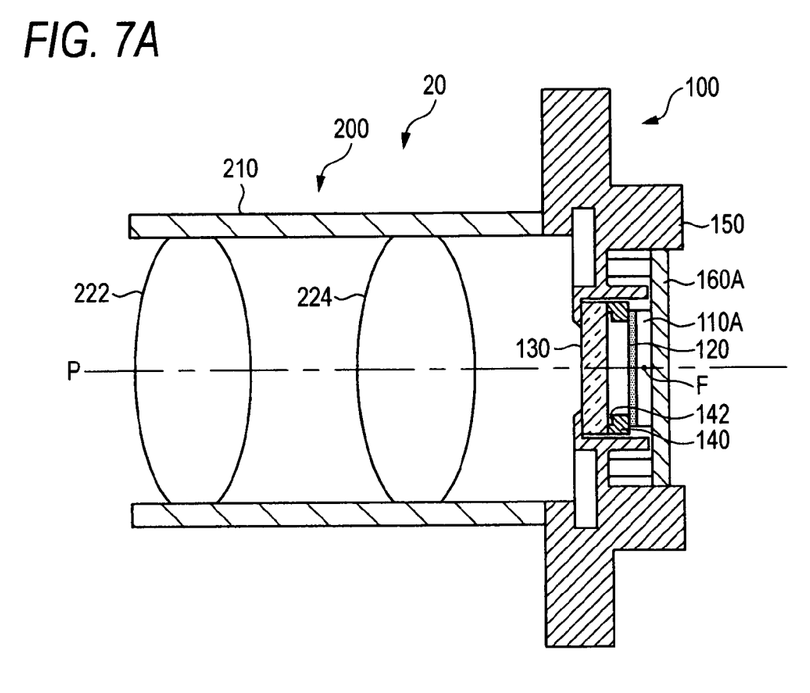
FIGS. 7A and 7B are sectional views to show an imaging apparatus according to a second exemplary embodiment of the invention.
Figure 7B:
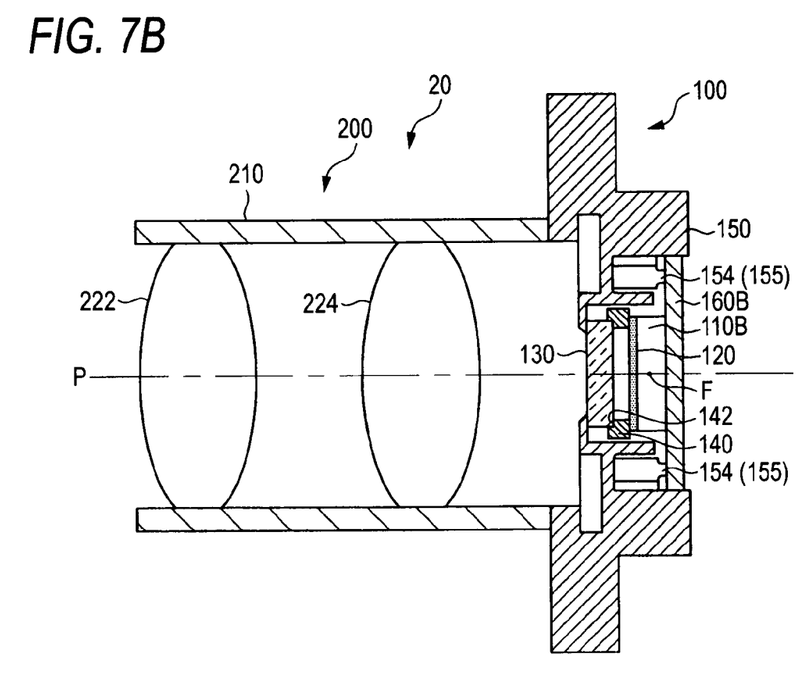

The imaging apparatus 10 according to the first embodiment of the invention has been described. Next, an imaging apparatus 20 according to a second exemplary embodiment of the invention will be discussed based on FIGS. 7A and 7B. FIGS. 7A and 7B are sectional views to show the general configuration of the imaging apparatus 20 according to the embodiment.

In the imaging apparatus 20, the shape of a spacer 140 is designed, specifically the spacer 140 is provided with a step 142, whereby the same spacer 140 can be used if two types of CCDs, a first CCD 110A and a second CCD 110B different in thickness in an optical axis P direction are used unlike the first embodiment described above.

That is, to use the first CCD 110A having a small thickness in the optical axis P direction, dummy glass 130 is abutted against a face other than the step 142 of the spacer 140; to use the second CCD 110B having a large thickness in the optical axis P direction, dummy glass 130 is abutted against the step 142 of the spacer 140, whereby if the two types of CCDs, the first CCD 110A and the second CCD 110B different in thickness in the optical axis P direction are used, the same spacer 140 can be used for matching the position of the light reception surface of the CCD 110A, 110B with the image formation position of an optical image from a lens unit 200.

The components other than the spacer 140 are similar to those of the first embodiment described above and therefore will not be discussed again.

Although the preferred embodiments of the invention have been described with reference to the accompanying drawings, the invention is not limited to the specific embodiments, needless to say. Those skilled in the art will recognize that various change examples or modified examples of such embodiments exist. Such change examples or modified examples are intended to be within the scope of the invention and the appended claims.

For example, in the description of the embodiment, the thicknesses of the cover glass 120 and the dummy glass 130 are the same; however, if the sum total of the thicknesses of the cover glass 120 and the dummy glass 130 is the same, when imaging devices different in thickness in the optical axis direction and image formation position are used, the thickness of the cover glass 120 may differ from that of the dummy glass 130.

For example, in the description of the embodiment, the two types of support boards, the CCD support boards 160A and 160B formed in response to the two types of CCDs 110A and 110B different in thickness in the optical axis P direction can be selectively attached to the holder 150; however, the number of the types of support boards that can be attached to the holder is not limited to two and three or more types of support boards may be made able to be selectively attached to the holder.

While the invention has been described with reference to the exemplary embodiments, the technical scope of the invention is not restricted to the description of the exemplary embodiments. It is apparent to the skilled in the art that various changes or improvements can be made. It is apparent from the description of claims that the changed or improved configurations can also be included in the technical scope of the invention.

This application claims foreign priority from Japanese Patent Application No. 2006-87898, filed Mar. 28, 2006, the entire disclosure of which is herein incorporated by reference.

What is claimed is:

1. A camera unit comprising:
   an imaging device that receives light of an optical image incident from a lens unit;
   a support board that supports the imaging device; and
   a holder having an attachment part to which the support board is attached,
   wherein
   at least one of the attachment part of the holder and the support board has an irregularity part, the irregularity part determining an attachment position of the support board in an optical axis direction with respect to the holder so that a light reception surface of the imaging device matches an image formation position of the optical image, and
   wherein the irregularity part comprises a protrusion part on the attachment part of the holder and a notch or through hole in the support board so as to avoid the protrusion part, the protrusion part and the notch or through hole fitting together to determine the attachment position of the support board.

2. The camera unit according to claim 1, wherein different support boards can be selectively attached to the attachment part of the holder in accordance with at least one of a thickness and the light reception surface of the imaging device.

3. The camera unit according to claim 1 wherein a first support board having the notch or through hole and a second support board not having the notch or through hole can be selectively attached to the attachment part of the holder.

4. The camera unit according to claim 2, wherein the irregularity part comprises a protrusion part on the attachment part of the holder and a notch or through hole in the support board so as to avoid the protrusion part, the protrusion part and the notch or through hole fitting together to determine the attachment position of the support board.

5. The camera unit according to claim 4 wherein a first support board having the notch or through hole and a second support board not having the notch or through hole can be selectively attached to the attachment part of the holder.

6. An imaging apparatus comprising a camera unit according to claim 1.

* * * * *